Aug. 17, 1943.    J. DICHTER    2,327,179
APPARATUS FOR SORTING AMPULES
Filed July 9, 1941    2 Sheets-Sheet 1

Inventor
JAKOB DICHTER
By Charles B. Belknap
Attorney

Aug. 17, 1943.   J. DICHTER   2,327,179
APPARATUS FOR SORTING AMPULES
Filed July 9, 1941   2 Sheets-Sheet 2
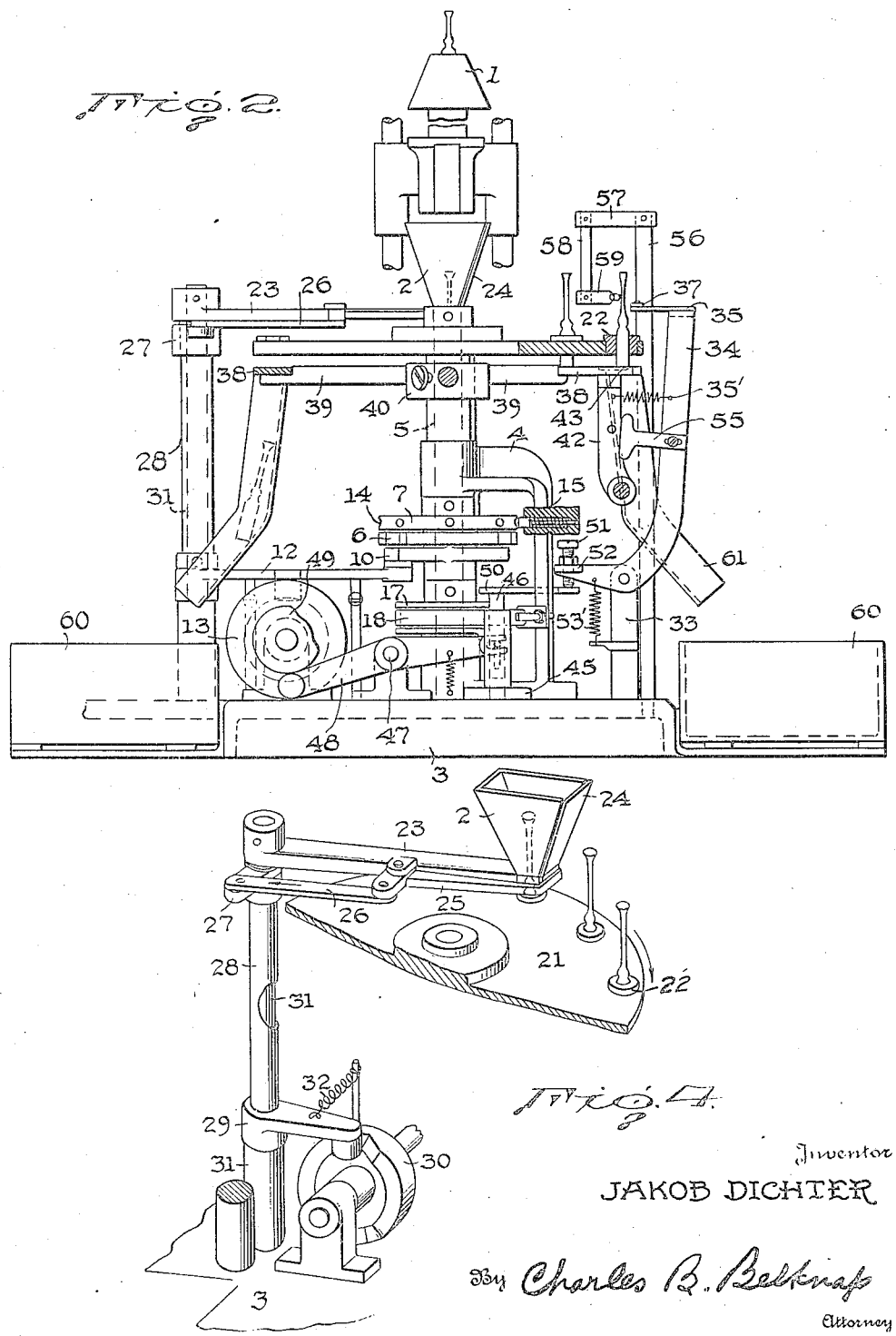

Patented Aug. 17, 1943

2,327,179

UNITED STATES PATENT OFFICE 2,327,179

APPARATUS FOR SORTING AMPOULES

Jakob Dichter, Berlin-Schoneberg, Germany, assignor to Kimble Glass Company, Vineland, N. J., a corporation of Illinois Application July 9, 1941, Serial No. 401,682
In Germany August 9, 1940

6 Claims. (Cl. 209—82)

The present invention relates to a machine for sorting glass containers, more particularly ampoules. The necks of ampoules of the type that are filled and sealed are produced by drawing out a glass tube that has been heated at a predetermined portion thereof. The diameters of ampoule necks produced by both hand and machine work vary somewhat due to the fact that the diameter of the neck is dependent on the relative heat of the glass blank at the time the tube is drawn. In handwork the period of heating and the speed of drawing may vary considerably. In machine work, the drawing speed and the heating period are, of course, constant. Nevertheless, since glass tubes vary in diameter and wall thickness, even with the most careful selection, there are always variations which provide necks of varying diameters. Since ampoules are almost entirely filled today by machine, that is, by means of a hollow needle inserted in the neck, the diameters of the necks can vary only within certain limits. Since the sealing burner is pre-adjusted to provide a predetermined heating temperature for a definite period, it is obvious that thin necks seal quicker than wide ones. It frequently happens that thin necks will be bead shaped, while the thick or wide necks do not seal completely, leaving a fine capillary opening, so that air may enter the ampoule and contaminate its contents. This difficulty is largely remedied when ampoules are sorted by hand with special gauging instruments, but the gauging operation is very time-consuming and unreliable because it is difficult for the workmen to conduct this purely mechanical work continuously with the necessary accuracy.

The customary manufacturing differences in the diameters of ampoule necks amount to about 1 mm. Since experience proves that 0.2–0.5 mm. difference in necks may be worked without the occurrence of the defects noted above, a sorting into approximately five different groups is very costly, time-consuming, and unreliable. The present invention is intended to obviate the inaccuracies referred to above.

One of the objects of the invention is to provide a machine for measuring and sorting ampoules, the necks thereof being automatically measured by one or more measuring devices engageable with the necks at a predetermined distance from one end of the body of the ampoule and, corresponding with the measured diameter, the ampoules are sorted automatically into groups according to neck diameter. In this way it is possible for the ampoules to be wholly measured and sorted automatically into any number of neck-diameter groups, either in connection with an ampoule shaping machine or at a location remote therefrom.

In the use of the invention as described herein there is also the advantage that it is possible to maintain a continuous control during production, so that the producing machine, already set to a predetermined diameter, may be controlled or modified continuously. Where the measuring and sorting device is located in proximity to and operated in timed relation with the shaping machine, unnecessary breakage due to jamming is avoided. This is important inasmuch as ampoules are fabricated from relatively fine and thin glass tubing and the thin long necks thereof are extremely breakable.

Another object of the invention is to provide a novel form of conveyor which carries the ampoules to gauging stations where adjustable measuring devices, set for the prescribed diameters, sort the ampoules. These measuring devices are so arranged that there are several measuring stages or steps in order that the sorting may be done into several diameter groups.

Since the ampoule neck intended to be cut is longer than the finished or sealed ampoule, and is usually tapered, it is important that the measurement be made at the line of cut. For this purpose, the machine is provided with an adjustable guide which automatically positions the ampoule with respect to the gauging devices, so that the necks are gauged at a predetermined distance from the bottom. The ampoules measured within definite diameter clearances are then separated automatically, and deposited in suitable collecting containers.

In the preferred form of the invention, the ampoules are transported by the conveyor to the gauging stations while they are in a vertical position, but this is only illustrative of the invention and is not intended to be a limitation thereof. The conveyor shown is provided with collapsible supports for the ampoules, these supports being actuated by the gauging devices in such a way that the support is withdrawn and the ampoules deposited in their proper containers.

In the preferred arrangement of gauging stations, necks of the smallest diameter are first separated, after which those of larger diameter are progressively separated.

In the drawings:

Fig. 2 is a side elevation thereof, parts being shown in section;

Fig. 4 shows details of the transferring mechanism from the producing machine to the measuring and sorting machine.

Figure 1:
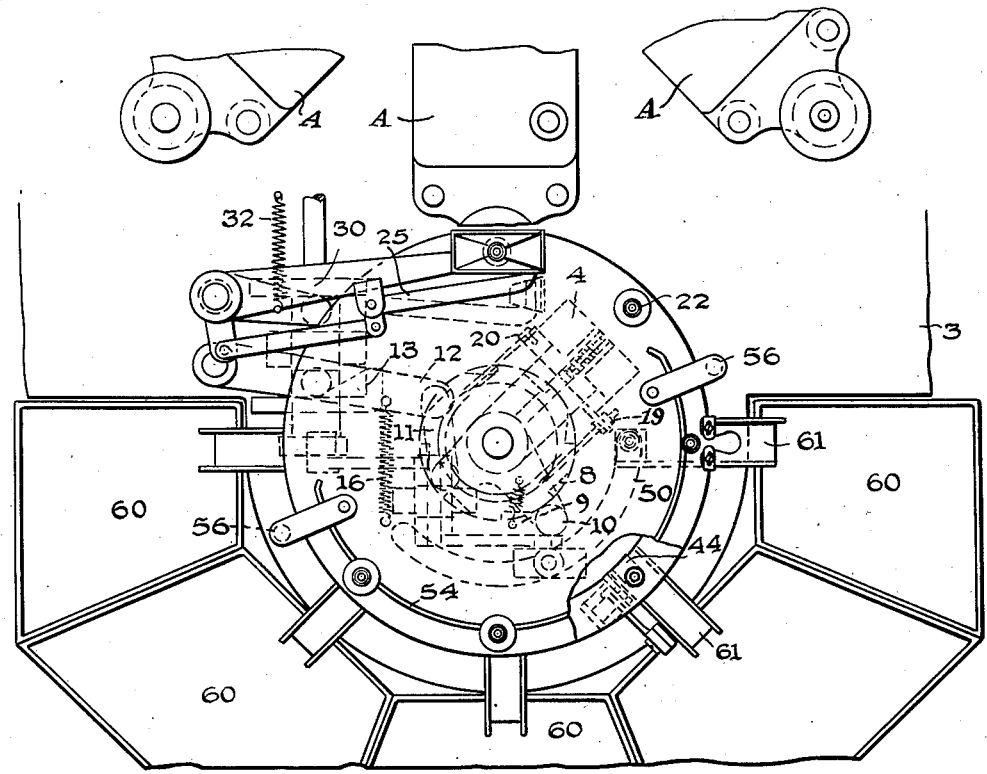
Fig. 1 is a plan view of the machine.

The invention illustrated herein is intended for use in connection with an ampoule making machine described in the patent to Dichter No. 1,962,985, the base of the latter being indicated at A in Fig. 1. The sorting machine is preferably driven in timed relation to the ampoule shaping machine.

The drawing illustrates an automatic arrangement in which the conveyor comprises an intermittently rotated plate arranged about a central axis, the plate having ampoule holders uniformly spaced therearound. The ampoules are held in a vertical position and supported on slidable shelves underlying the body of the ampoule, the shelves being adjustable vertically in order that the necks may be measured at a predetermined distance from one end of the ampoule and suitably secured to the rotatable plate in order that they may always be flush with the supporting surface of the adjustable guide.

In the embodiment of the machine as illustrated in the drawings, the ampoules are clamped in the lower clamping chuck 1 of the ampoule shaping machine after separation from the length of tubing from which the ampoules are shaped. This clamping chuck has a bore therethrough, in order that the ampoules may fall out when its clamping jaws are opened. In the Dichter patent referred to, these ampoules fall into a chute when the lower chuck opens, but, in the present invention, the ampoules are positioned on a sorting mechanism. Since the chucks of the shaping machine rotate continuously about a central axis, the hopper 2 on the sorting machine is funnel-shaped to permit the ampoules properly to fall thereinto. The sides of the hopper converge so that the bodies of the ampoules are positioned centrally of the hopper.

Upon the base plate 3 of the shaping machine there is secured the pedestal bearing 4 in which the shaft 5 is mounted (Figs. 1 and 2). The lower end of this shaft 5 carries an indexing ratchet 6 and a lock plate 7. The periphery of the ratchet is provided with recesses 8, uniformly distributed therearound (Fig. 2), and with which pawls 9 engage, the ratchet being indexed by means of a bell crank lever 10, link 11, lever 12, and cam 13. The plate 7 has recesses 14 in its periphery spaced a distance equal to the spacing of the ratchet teeth and engageable by a spring-urged pin 15 which locks the indexing mechanism when lever 12 is returned to its normal position by the draw-spring 16. In order that movement of shaft 5 due to the inertia of the moving parts may be partially resisted, there is secured to shaft 5 beneath the indexing ratchet 6 a brake drum 17 engaged by brake band 18, one end of the latter being secured at 20 to the pedestal 4 and at the other end to an adjusting screw 19 which is fastened on the pedestal 4.

Keyed to the upper end of shaft 5 is a circular plate 21 adjacent the outer edge of which are uniformly spaced apertures accommodating interchangeable holding bushings 22 (Figs. 1 and 4). These receiving bushings 22 are successively indexed to underlie funnel-like chute 2 in order that the ampoules may pass from the funnel into the bushings 22.

As shown in the drawings, three sides of chute 2 are rigidly secured to arm 23, while one side 24 of the chute is movable with respect to the other sides, being supported by a pivoted bell crank lever 25 and swingable therewith. Lever 25 is connected by link 26 to arm 27 fixed to hollow shaft 28 to which is also fixed an arm 29 actuated by cam 30 (Fig. 4).

Arms 23, 27 and 29, and hollow shaft 28 are supported on post 31 fixed to the base plate 3, the post being enlarged at its lower end, forming a shoulder for arm 29 and shaft 28. Shaft 28 and arm 29 are rotatable on post 31, being moved in one direction by cam 30 and in the opposite direction by spring 32.

Figure 3:
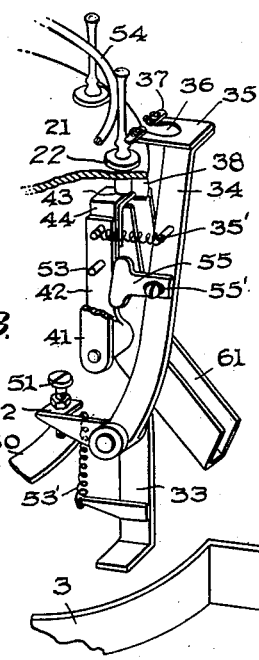
Fig. 3 shows details of the measuring mechanism.

The gauging mechanism is illustrated in Figs. 2 and 3. Angle piece 33 is mounted on base plate 3 and supports a pivoted lever 34. At the upper end of lever 34 is a plate 35 having therein an opening 36 substantially larger than the ampoule necks and carrying a pair of opposed adjustable gauging jaws 37 which are preferably tapered so as to center the ampoule necks.

Disposed beneath plate 21 is a ring 38 secured to arms 39, the latter being secured to a hub 40 which is adjustable vertically along shaft 5 but does not turn with the shaft. This hub is secured against turning with respect to bearing 4 by any suitable means. Ring 38 acts as a support for the ampoules, the bottoms of which slide along the ring as they are moved by plate 21. The ring is adjustable vertically to position the necks of the ampoules and to accommodate ampoules of several lengths. The portion of the ampoule neck to be engaged is accurately fixed by adjusting the height of the supporting ring. Attached to slide ring 38 is a bracket 41 to the lower end of which lever 42 is pivoted.

Opposite each of the gauging stations ring 38 is provided with a recess 43 into which extends the flange 44 on the upper end of lever 42. Flange 44 is movable with the slide ring 38 and normally registers with and fills recess 43 of ring 38 so that the ampoules are supported thereon except when the flange is withdrawn from the recess.

Base plate 3 also has secured thereto bearing 45 in which a slidable post 46 is mounted for vertical reciprocation by cam 49 and lever 48 pivoted at 47. Post 46 is secured against turning in the bearing 45 by any suitable means. Secured to the upper end of post 46 is a segment 50 adapted to engage a set screw 51 threaded in flange 52 on lever 34 so that the lever 34 and gauging jaws 37 are rocked toward and from the ampoule neck. Simultaneously, flange 44 is moved into and out of recess 43 of the slide ring 38, spring 35' being attached to levers 34 and 42 to urge flange 44 into the recess when segment 50 is elevated.

After plate 21 has been indexed and locked by pin 15, segment 50 is lowered, lever 48 at this time following the low portion of cam 49 so that the flange 52 is drawn downward by spring 53' and lever 34 together with the gauging jaws is urged toward the neck of the ampoule. At this stage the ampoule neck is engaged by an arcuate guide 54 which holds its upright. If the diameter of the neck is greater than the distance between the gauging jaws, the latter will engage the neck and remain in this position until they are removed upon further elevation of segment 50. The ampoules are then indexed to the next station. When the gauging jaws pass over the ampoule neck, lever 34 rocks radially inwardly a distance sufficient to permit the ampoule neck to enter the recess 36. The stop 55 on the lever 34 then engages pin 53 on lever 42, whereupon flange 44 on lever 42 is withdrawn from recess 43 in the slide ring 38. The ampoule body then falls through this recess into the chute 61. The stop 55 is provided with a relatively long face in order that contact with the pin 53 will be provided regardless of the adjusted height of slide ring 38 and pin 53.

Stop 55 is provided with a slot 55' to permit adjustment of the stop so that the gauges may be used with different sizes of ampoules. The guide 54 is attached to vertical standard 56 secured to plate 3 and connected to the standard by the vertically and horizontally adjustable members 57, 58, 59. As already stated, it serves to keep the ampoule upright during the gauging step. To prevent breakage it is located directly above or below the gauging jaws. Special boxes 60 are provided opposite the gauging stations to receive the sorted ampoules.

While a preferred form of the invention has been shown and described, it is apparent that changes in the form thereof may be made without departing from the principles involved as defined in the claims appended hereto.

What is claimed is:

1. Apparatus for measuring and sorting ampoules having reduced neck portions thereon comprising a conveyor for transporting the ampoules, a plurality of spaced rockable levers, a gauging device on each of said levers, each of said devices being positioned to move into gauging relation with the necks of the ampoules at a predetermined distance from one end of the ampoules, means cooperating with said conveyor and movable to a position for supporting the ampoules, means for rotating said conveyor intermittently, means actuated in timed relation with said conveyor rotating means for rocking said levers, means for yieldably connecting the ampoule supporting means with the gauging devices, and means actuated by said devices moving said supporting means out of supporting position for releasing the ampoules from the conveyor.

2. Apparatus for measuring and sorting ampoules having reduced neck portions thereon comprising a conveyor for transporting the ampoules, a plurality of spaced rockable levers, a gauging device on each of said levers, each of said devices being positioned to move into gauging relation with the necks of the ampoules at a predetermined distance from one end of the ampoules, means on said conveyor for holding the ampoules vertically thereon, means actuated in timed relation with said conveyor rotating means for rocking said levers, ampoule supporting means disposed below the conveyor, the bottoms of the ampoules having sliding engagement with said supporting means, means for selectively positioning said supporting means in vertically spaced relation to said gauging devices, and means actuated by said devices for releasing the ampoules from the conveyor.

3. Apparatus for measuring and sorting ampoules having reduced neck portions thereon comprising a conveyor for transporting the ampoules, a plurality of spaced rockable levers, a gauging device on each of said levers, each of said devices being positioned to move into gauging relation with the necks of the ampoules at a predetermined distance from one end of the ampoules, means on said conveyor for holding the ampoules vertically thereon, means actuated in timed relation with said conveyor rotating means for rocking said levers, ampoule supporting means disposed below the conveyor, said supporting means having recesses therein, a removable member registering with each recess, the bottoms of the ampoules having sliding engagement with said supporting means and said removable members, means for selectively positioning said supporting means in vertically spaced relation to said gauging devices, and means actuated by said devices for moving said removable members out of registering relation with said recesses to release the ampoules from the conveyor.

4. Apparatus for measuring and sorting ampoules having reduced neck portions thereon comprising a conveyor for transporting the ampoules, a plurality of spaced gauging devices, each of said devices being positioned to move into gauging relation with the necks of the ampoules at a predetermined distance from one end of the ampoules, means for intermittently moving said conveyor, means for positioning ampoules on said conveyor including a chute having a removable side, a rockable arm attached to said side, and cam means moving in timed relation to said conveyor for rocking said arm to swing said side out of the path of ampoules on the conveyor during motion of the conveyor.

5. Apparatus for measuring and sorting ampoules having reduced neck portions thereon comprising a conveyor for transporting the ampoules, a plurality of spaced gauging devices, each of said devices being positioned to move into gauging relation with the necks of the ampoules at a predetermined distance from one end of the ampoules, means for intermittently moving said conveyor, means for positioning ampoules on said conveyor including a chute having a removable side, a rockable arm attached to said side, and cam means moving in timed relation to said conveyor for rocking said arm to swing said side out of the path of ampoules on the conveyor.

6. Apparatus for measuring and sorting ampoules having reduced neck portions thereon comprising a conveyor for transporting the ampoules, a plurality of spaced gauging devices, each of said devices being positioned to move into gauging relation with the necks of the ampoules at a predetermined distance from one end of the ampoules, means opposite said gauging devices laterally supporting the ampoule necks, and means for varying the position of said lateral supporting means with respect to said conveyor.

JAKOB DICHTER.